Sept. 13, 1966      D. WERMAN      3,271,887
SHOE CONSTRUCTION
Filed June 8, 1965
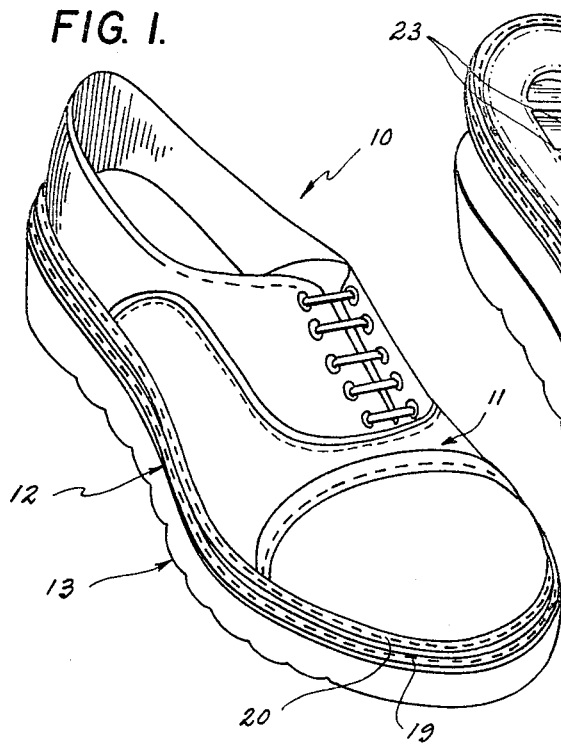
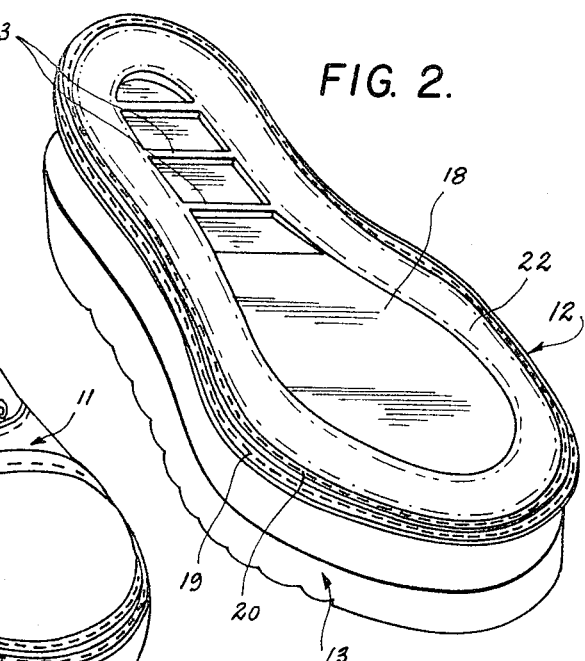
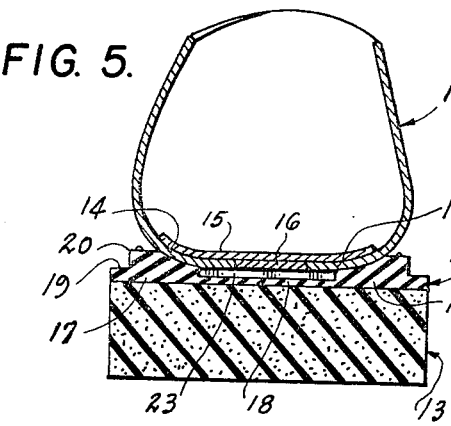
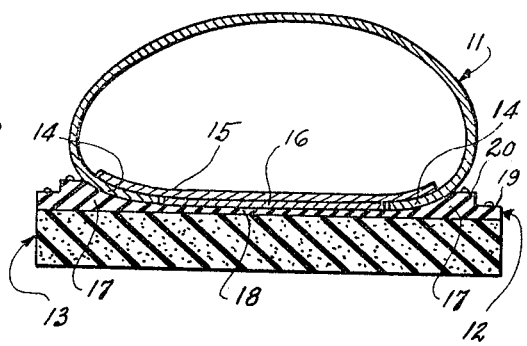
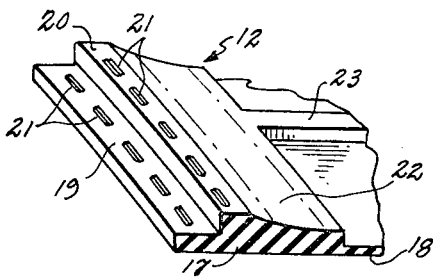
INVENTOR
DAVID WERMAN
BY
ATTORNEY

United States Patent Office 3,271,887
Patented Sept. 13, 1966

3,271,887
SHOE CONSTRUCTION
David Werman, Merrick, N.Y., assignor to A. Werman & Sons, Inc., New York, N.Y., a corporation of New York
Filed June 8, 1965, Ser. No. 462,180
6 Claims. (Cl. 36—14)

This invention relates generally to shoe construction and is particularly directed to improvements in the construction of shoes of the type having an inwardly lasted upper and a tread surface constituted by a molded outer sole of an elastomeric compound of natural or synthetic rubber or resinous material.

Although it has been recognized that molded outer soles of elastomeric compounds of natural or synthetic rubber or resinous material possess many advantages over leather soles in that such molded soles are waterproof and resilient and can be molded in any desired shape without waste or costly trimming operations, difficulties have been experienced in producing fully satisfactory shoes embodying molded outer soles and in taking advantage of the seemingly obvious manufacturing economies inherent therein. Merely substituting a molded outer sole for the conventional leather outer sole which is cemented and stitched, at its periphery, to a leather midsole joined, in turn, to the upper does not appreciably reduce the cost of a shoe. Thus, other innovations have been tried in the interest of economy. For example, it has been proposed to provide a one-piece sole unit constituting the tread surface and which is molded directly onto the inwardly lasted upper or separately molded and then cemented or vulcanized directly onto the upper. A one-piece sole unit secured directly to the upper is disadvantageous in that, if formed of a dense, solid material to provide an adequate base for attachment of the upper thereto, the sole unit is undesirably heavy and requires a large mass of material. On the other hand, if the one-piece sole unit is formed of a spongy material of relatively low specific gravity so as to reduce the weight of the sole unit and the mass of material required for its manufacture, such material does not provide the necessary lateral stiffness and shape-holding properties at the region of its attachment to the upper. Further, existing one-piece molded sole units cemented directly to the uppers do not adequately protect the cement bond from deterioration by water, dirt or other foreign matter. Where a conventional storm welt is provided for such protection so as to increase the durability of the shoe, the production of the storm welt involves a number of manufacturing operations which materially increase the cost of the product.

One-piece molded sole units attached directly to the uppers also have a characteristic appearance in that the exposed periphery of the sole unit is necessarily homogeneous in color and texture throughout its thickness, which appearance serves to distinguish shoes embodying such soles from shoes of more costly construction having a discernible midsole interposed between the upper and outer sole.

Accordingly, it is an object of this invention to provide an economical shoe construction having an inwardly lasted upper and an outer sole molded of natural or synthetic rubber or other resilient resinous materials, and which avoids the above mentioned disadvantages of the previous proposals for shoes of this type.

In accordance with an important aspect of this invention, a shoe having an upper with inwardly lasted margins is provided with a molded one-piece midsole and welt member including a relatively thick continuous peripheral portion having a double-stepped outer margin simulating a storm welt extending therealong and an upper surface sloping downwardly from the inner perimeter of the storm welt. The inwardly lasted margins of the upper rest in facially abutting relation on the sloping upper surface of the midsole and are there secured to the latter, and a discrete molded outer sole member is secured to the underside of the one-piece midsole and welt member and constitutes the tread surface of the shoe.

Since the one-piece midsole and welt member and the outsole member are separately molded, the possibility exists of forming the same of materials having properties that are most suitable for their respective functions. Thus, the midsole and welt member may be formed of a dense, tough material while the outer sole member is formed of a light spongy material to reduce the weight of the shoe and to economize on the mass of material required therefor. Further, the separately molded midsole and welt member may be of contrasting or distinctive colors, either to simulate the appearance of shoes of costly construction or to provide a uniquely attractive appearance.

The above, and other objects, features and advantages of this invention, will be apparent in the following detailed description of an illustrative embodiment thereof which is to be read in connection with the accompanying drawing, wherein:

FIG. 1 is a perspective view of a shoe constructed in accordance with this invention;

FIG. 2 is an exploded perspective view of a midsole and welt member and an outer sole member included in the shoe construction embodying this invention;

FIG. 3 is a fragmentary, enlarged perspective view of a peripheral portion of the midsole and welt member;

FIG. 4 is a transverse sectional view taken through the toe portion of the shoe in accordance with this invention; and FIG. 5 is a view similar to that of FIG. 4, but taken through the heel portion of the shoe.

Referring to the drawing in detail, and initially to FIG. 1 thereof, it will be seen that a shoe 10 in accordance with this invention generally comprises an upper 11 attached to a midsole and welt member 12 and an outer sole member 13 joined to the underside of member 12.

The upper 11 is of conventional construction and may be of any shape, size or type that may be desired. The upper may be formed of leather, synthetic materials simulating the appearance of leather, or of a suitably woven fabric. The upper is suitably shaped or pulled over a last (not shown) and has inwardly directed lasting margins 14 (FIGS. 4 and 5) which extend under and are adhesively or otherwise secured to the peripheral portion of a sock lining or insole 15, with a filler 16 filling in the space between the inner edges of lasting margins 14.

The outer sole member 13 is molded of compounds of natural of synthetic rubber or other elastomeric materials, such as, polyvinyl chloride, so as to provide a wear resistant, resilient tread surface constituted by the underside of member 13 which may be ribbed or ridged, as shown (FIGS. 1 and 2). In order to minimize the weight of the shoe and provide a cushioned tread surface, outer sole member 13 may be formed of a spongy or foamed material of relatively low specific gravity, which has the further advantage of reducing the mass of material required for manufacture of the outer sole. The outer sole member 13 is preferably shaped to provide a heel portion as an integral part thereof.

In accordance with this invention, the midsole and welt member 12 is a one-piece molded body of tough elastomeric material, for example, a polyvinyl chloride.

The member 12, as shown particularly on FIG. 2, is peripherally coextensive with outer sole member 13 and includes a relatively thick continuous peripheral portion 17 (FIGS. 3, 4 and 5) and an inner portion 18 which is surrounded by peripheral portion 17 (FIG. 2), and is relatively thin over substantially its entire area. The relatively thick peripheral portion 17 has two steps 19 and 20 at its outer margin simulating a storm welt extending therealong, and the upper surfaces of steps 19 and 20 are embossed or contoured, as at 21 (FIG. 3), to simulate the appearance of the stitching conventionally employed in producing a storm welt. The upper surface 22 of peripheral portion 17 (FIGS. 2 and 3) slopes downwardly from the upper step 20, that is, from the inner margin of the simulated storm welt, toward the inner portion 18.

The member 12 is shaped and dimensioned so that the sloping surface 22 of its peripheral portion 17 conforms to, and underlies the inwardly directed lasting margins 14 of upper 11, as is apparent on FIGS. 4 and 5, thereby to form a continuous seat along which the upper structure can be conveniently and securely attached to the midsole and welt member 12. Since the surface 22 only slopes downwardly from the top step 20, the upper 11 rests on such surface 22 rather than being confined within a well, as is the case where the storm welt projects upwardly from the surface to which the upper is to be secured, and butts against the side surface of the upper. This, it is not necessary to maintain excessively close tolerances in positioning the upper with respect to member 12. Even if the upper is positioned slightly away from its desired location on member 12, the described configuration of the latter will permit close contact of the lasting margins 14 with surface 22 over a maximum area at which upper 11 and member 12 can be securely cemented or otherwise bonded together. By reason of such contact over a maximum area of surface 22, there is little opportunity for water, dirt or other foreign matter to enter between lasting margins 14 and surface 22 and deterioration of the cement or other bond therebetween is prevented. The double-step configuration of the outer margin of peripheral portion 17 further serves to protect the bonding of member 12 to upper 11.

As particularly shown on FIG. 2, the thin inner portion 18 of member 12 may have thickened ribs 23 extending thereacross or disposed in other grid-like patterns, at least at the heel part thereof, to increase the effective height of the midsole and welt member without unduly increasing the weight or mass of material therein.

In producing the above described shoe 10 embodying this invention, the separately molded midsole and welt member 12 and outer sole member 13, formed of different materials which are nevertheless compatible, may be initially joined together at the underside of member 12, for example, by vulcanizing or by injection molding member 12 or 13 onto the other which has been previously molded. The sub-assembly thus produced, that is, the assembly of members 12 and 13, is then attached to upper 11, for example, by suitable cement applied in a continuous band to surface 22, as between the broken lines 24 on FIGS. 2 and 3.

In an alternative method of production, the previously molded midsole and welt member 12 can be first secured to upper 11, as by cementing or vulcanizing to the latter, or the member 12 may be injection molded onto the upper, with the separately molded outer sole member 13 being thereafter suitably secured to the underside of member 12.

Whichever of the above production methods is employed, it will be apparent that the completed shoe has the appearance of a storm welt construction, and that such appearance is achieved without the numerous and costly operations usually involved in storm welt shoe construction. Further, since the member 12, which functions both as a midsole and storm welt, and the outer sole member 13 are separately molded, such members may be formed of materials most suitable for their respective functions so as to economize on the mass of material required while minimizing the weight of the shoe. A further advantage of the separate molding of members 12 and 13 is the fact that such members may be differently colored or textured either to further enhance the simulation of a conventional storm welted shoe construction or to provide uniquely attractive color combinations.

Although a particular embodiment of a shoe in accordance with this invention has been described in detail herein with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. A shoe comprising an upper having inwardly directed lasting margins, a one-piece molded midsole including a continuous peripheral portion of substantial thickness having a double-stepped outer margin simulating a storm welt and a surface sloping downwardly at the inside of said storm welt, said lasting margins of the upper being in facially abutting relation, and secured to said sloping surface of the peripheral portion of said midsole, and a molded outer sole secured to the underside of said midsole and constituting the tread surface of the shoe.

2. A shoe as in claim 1; wherein said one-piece midsole and said outer sole are respectively of elastomeric materials having relatively high and low specific gravities to provide firm support for the upper and a cushioned tread surface while avoiding excessive weight in the assembly of said midsole and outer sole.

3. A shoe as in claim 1; wherein the inner portion of said one-piece midsole enclosed by said peripheral portion of the latter is in the form of a thin web which, at least at the heel part of the shoe, has integral spaced ribs extending thereacross.

4. A shoe comprising an upper having inwardly lasted margins, a one-piece midsole and welt member molded of tough elastomeric material and including a relatively thick continuous peripheral portion and an inner portion surrounded by said peripheral portion and being relatively thin over substantially its entire area, said peripheral portion having a double-stepped outer margin simulating a storm welt extending therealong and an upper surface sloping downwardly toward said inner portion from the inner perimeter of said storm welt, said inwardly lasted margins of the upper resting in facially abutting relation on said downwardly sloping surface and being secured thereto, and a discrete molded outer sole member secured to the underside of said one-piece midsole and welt member and constituting the tread surface of the shoe.

5. A shoe as in claim 4; wherein said outer sole member is of relatively spongy elastomeric material to provide a cushioned tread of relatively light weight.

6. A shoe as in claim 4; wherein said inner portion of the midsole and welt member has ribs extending thereacross, at least at the heel part of the shoe, to increase the effective height thereof without correspondingly increasing the weight of said midsole and welt member.

References Cited by the Examiner

UNITED STATES PATENTS 2,958,965   11/1960   Scala _____ 36—14 X

FOREIGN PATENTS 1,213,006   10/1959   France.
1,237,368   6/1960   France.

FRANK J. COHEN, *Primary Examiner.*